(12) United States Patent
Sandin

(10) Patent No.: US 6,863,995 B2
(45) Date of Patent: Mar. 8, 2005

(54) METHOD FOR BRAZING COMPONENTS USING A NI-AU-P TERNARY BRAZING ALLOY, THE ASSEMBLY SO PRODUCED AND THE TERNARY ALLOY

(75) Inventor: Thomas A. Sandin, Redwood City, CA (US)

(73) Assignee: Praxair S.T. Technology, Inc., North Haven, CT (US)

( * ) Notice: Subject to any disclaimer, the term of this patent is extended or adjusted under 35 U.S.C. 154(b) by 111 days.

(21) Appl. No.: 10/438,985

(22) Filed: May 16, 2003

(65) Prior Publication Data

US 2004/0229069 A1 Nov. 18, 2004

(51) Int. Cl.[7] ................ B32B 15/01; B23K 35/28; C22C 5/02; C22C 19/03
(52) U.S. Cl. ................ 428/672; 428/680; 428/679; 420/512; 420/456; 228/262.31; 228/262.61
(58) Field of Search ................ 428/672, 680, 428/679; 420/512, 456; 228/262.31, 262.61

(56) References Cited

U.S. PATENT DOCUMENTS

| | | | |
|---|---|---|---|
| 2,851,233 A | * 9/1958 | Hayden | 245/10 |
| 2,944,891 A | * 7/1960 | Cape | 420/444 |
| 3,238,040 A | 3/1966 | Durer et al. | 75/172 |
| 3,418,422 A | * 12/1968 | Bradham, III | 174/94 R |
| 3,658,997 A | 4/1972 | Sloboda et al. | 75/165 |
| 3,764,307 A | 10/1973 | Barb et al. | 75/170 |
| 3,853,548 A | 12/1974 | Fairbanks et al. | 75/171 |
| 4,149,881 A | 4/1979 | D'Silva | 75/134 |
| 4,293,089 A | 10/1981 | McCormick et al. | 228/215 |
| 4,302,515 A | 11/1981 | DeCristofaro et al. | 428/680 |
| 4,447,391 A | * 5/1984 | Mizuhara | 420/456 |
| 4,606,978 A | 8/1986 | Mizuhara | 428/606 |
| 4,726,508 A | 2/1988 | Carpenter | 228/263.13 |
| 4,764,435 A | 8/1988 | Hosizaki et al. | 428/621 |
| 2002/0170633 A1 | * 11/2002 | Uchida et al. | 148/430 |

FOREIGN PATENT DOCUMENTS

| | | |
|---|---|---|
| JP | 62-235440 | * 10/1987 |
| JP | 63-313690 | * 12/1988 |
| JP | 63-317276 | * 12/1988 |

* cited by examiner

Primary Examiner—John J. Zimmerman
(74) Attorney, Agent, or Firm—Gerald L. Coon

(57) ABSTRACT

A method for using a novel ternary nickel-gold-phosphorus brazing alloy for joining nickel-based components together and the assembly so formed.

20 Claims, No Drawings

METHOD FOR BRAZING COMPONENTS USING A NI-AU-P TERNARY BRAZING ALLOY, THE ASSEMBLY SO PRODUCED AND THE TERNARY ALLOY

FIELD OF THE INVENTION

The invention relates to nickel-gold-phosphorus brazed components, such as high quality nickel-based superalloy sheet components (stator vanes for use in jet engines). The invention also relates to a ternary braze alloy consisting of nickel-gold-phosphorus, and a method of using this ternary brazing alloy for joining metal components together.

BACKGROUND OF THE INVENTION

Brazing is a process in which a brazing alloy is inserted between the surfaces of components, such as metals, to join the components. Typically, a brazing alloy having a liquidus point below the melting point of the components to be joined is disposed between the surfaces of the components. The assembly formed from these components is then heated to a temperature sufficient to melt the brazing alloy so that upon cooling, a strong, ductility and corrosion/oxidation resistance assembly can be formed.

There are many gold-based brazing alloys which contain specific metal additives for desired specific properties. For example, gold-nickel alloys have good resistance to oxidation and high strength. These brazing alloys are particularly useful for joining metal components such as components of turbine and jet engines, Electronics, Automotive, and Marine equipment.

U.S. Pat. No. 3,658,997 discloses a gold-base brazing alloy for use in the fabrication of jewelry articles, jet engines and high quality engineering components comprising 30 to 80 wt. percent gold, 0.5 to 67.5 wt. percent copper and 2.0 to 12.0 wt. percent nickel. Additionally, the brazing alloy may include 0.5 to 7.0 wt. percent chromium and from a trace up to 0.5 wt. percent boron.

U.S. Pat. No. 3,658,997 discloses a Ni—Au base brazing alloy provided with a narrower temperature range between liquidus and solidus temperatures as a result of the combination of Cr and Fe along with Si and B to adjust the position of such range.

U.S. Pat. No. 3,764,307 discloses a nickel-gold base brazing alloy with relatively low gold content that derives its properties from a balance of Au, Si and B in a Ni base. This alloy has a liquidus of less than about 1900° F. for use in joining members intended to operate in the range of up to about 1400° F.

U.S. Pat. No. 4,726,508 discloses a method of brazing corrosion resistant, nickel-based, thin-walled tubing which includes substantial proportions of nickel, chromium and molybdenum to a stainless steel base member using a filler metal, principally comprising gold as a major constituent and nickel as a minor constituent, in a vacuum furnace without introducing stress corrosion cracks in the brazed tubing and also avoiding carbon precipitation.

U.S. Pat. No. 4,302,515 discloses a brazing foil, useful for brazing stainless steels, which has a composition consisting essentially of 0 to about 4 atom percent iron, 0 to about 21 atom percent chromium, 0 to about 19 atom percent boron, 0 to about 12 atom percent silicon, 0 to about 22 atom percent phosphorus and the balance nickel and incidental impurities. In addition to containing the foregoing elements within the above-noted composition ranges, the composition must be such that the total of iron, chromium and nickel ranges from about 76 to 84 atom percent and the total of boron, silicon and phosphorus ranges from about 16 to 24 atom percent.

U.S. Pat. No, 4,764,435 discloses a metal composition usable as a brazing material for bonding a metal to a non-oxide ceramic. The brazing material contains, at least, one or more metals selected from a first group of transition metals consisting of Pt, Pd, Rh, Ir, Ru and Os, and one or more metals selected from a second group of transition metals consisting of Cr, Mn, Fe, Co, Ni and Cu. The material may further contain one or more elements selected from a third group of elements consisting of B, C, Si and P.

Conventional gold-nickel braze alloys have been used for bonding nickel-chromium based components together, such as Inconel components (Inconel is a trademark for a group of corrosion-resistant alloys). Generally these nickel-chromium-based components (superalloy sheet metal components) would be bonded together using the gold-nickel basis alloys at temperatures above 1800° F. This high brazing temperature is generally high enough to coarsen the grain size of the components and thereby reducing their fatigue resistance. To lower the brazing temperature of the braze alloy, a temperature depressant, such as silicon and/or boron, have been used. These temperature depressants have not necessarily provided the positive control of the range between liquidus and solidus temperatures to improve the brazing of the components to be joined. Additionally, boron generally permeates the nickel-chromium-based components (such as stator vanes of jet engines) and if the temperature is too high (approximately 1900° F.), it could coarsen the grain size of the components and thereby permit the boron to diffuse into the components to further degrade the components properties.

It is an object of the present invention to provide a ternary nickel-gold-phosphorus brazing alloy that has the same or better characteristics of conventional gold-metal alloys, It is another object of the present invention to provide a ternary nickel-gold-phosphorus brazing alloy that has a brazing temperature less than 1830° F. and thus it is ideally suited for use with nickel-chromium-based superalloy sheet metal components.

It is another object of the present invention to provide a brazed metal article in which the article has been brazed with a novel ternary nickel-gold-phosphorus brazing alloy.

It is another object of the present invention to provide a brazed superalloy metal sheet article in which the article has been brazed with a ternary nickel-gold-phosphorus brazing alloy.

It is another object of the present invention to provide a method for brazing metal components together using a novel ternary nickel-gold-phosphorus brazing alloy in which the brazing temperature is held 40° F. below the eutectic temperature of the ternary nickel-gold-phosphorus brazing alloy.

It is another object of the present invention to provide a method for brazing superalloy metal sheets together with a novel ternary nickel-gold-phosphorus brazing alloy at a brazing temperature below 1830° F. and preferably 100° F. below of the eutectic temperature of the ternary nickel-gold-phosphorus brazing alloy.

It is another object of the present invention to provide a novel ternary nickel-gold-phosphorus brazing alloy that is economical to use and having good strength, ductility, and corrosion/oxidation resistance characteristics.

SUMMARY OF THE INVENTION

This invention is directed to a method for brazing metal components together using a novel ternary nickel-goldphosphorus brazing alloy, comprising the steps of (a) placing a ternary nickel-gold-phosphorus brazing alloy between two metal components to be joined, said brazing alloy consisting of between about 20 weight percent and about 80 weight percent gold, between about 1 weight percent and about 10 weight percent phosphorus, and the balance nickel and incidental impurities; (b) heating the assembly formed with said ternary nickel-gold-phosphorus brazing alloy and said metal components to at least 40° F. above the eutectic temperature of the brazing alloy and below 1830° F.; and cooling the assembly to effectively produce a sturdy unitary assembly. Preferably the composition of the ternary nickel-gold-phosphorus brazing alloy would consist essentially of between about 30 weight percent and about 60 weight percent gold, between about 2 weight percent and about 6 weight percent phosphorus and the balance nickel with incidental impurities; and most preferably the brazing alloy would consist essentially of between about 38 weight percent and about 42 weight percent gold, between about 2.5 weight percent and about 3.5 weight percent phosphorus and the balance nickel with incidental impurities. This brazing alloy utilizes phosphorus as a melting point depressant to lower the brazing temperature range of the binary nickel-gold alloy system. The addition of gold in various proportions to the ternary brazing alloy increases the ductility of the brazing alloy. Phosphorus in a nickel braze alloy has a eutectic of about 1650° F. and unfortunately at this eutectic, the brazed alloy tends to be brittle. Accordingly, the heating of the ternary brazing alloy and metal component assembly in step (b) should be at a temperature above about 40° F. of the eutectic temperature of the brazing alloy. Preferably the heating of the assembly in step (b) should be above about 100° F. of the eutectic temperature of the brazing alloy or between about 1670° F. and about 1820° F. In the preferred ternary nickel-gold-phosphorus brazing alloys of this invention, the alloys melt at an approximate temperature range of 1625° F. to 1630° F.

In superalloy nickel-chromium based metal components, such as Inconel X-750 stator vanes for jet engines, exposure to high brazing temperatures can result in the coarsening of the grain size of the component materials and thereby could cause failure in service resulting from high cycle fatigue. The grain growth of nickel-chromium-based metal alloys can be effectively eliminated by bringing the brazing temperature to below 1830° F., preferably between about 1730° F. and about 1780° F. and more preferably about 1740° F. to about 1760° F. The ternary nickel-gold-phosphorus brazing alloy of this invention that is intended to join nickel-chromium based components together, will be boron free; possess good strength; ductility; good corrosion and oxidation resistance characteristics; and have effective control of the metallurgical properties of the nickel-chromium based components including grain growth.

EXAMPLE

"T" shaped 304 stainless samples were formed and then tested with a ternary nickel-gold-phosphorus brazing alloy of this invention. A brazing powder was prepared by blending mixtures of a gold-nickel alloy per American welding Society, AWS Classification Bau-4 (82 wt % Au-18 wt % Ni) with an equal amount by weight of nickel-phosphorous alloy per AWS Bni-6 (10 wt % P balance Ni). The calculated nominal composition of the mixture was 54Ni-41AU-5P (weight percent).

The intent was to produce ductile joints for the "T" samples when brazed at temperatures in the 1750° F. to 1780° F. range. This test was to get the ductility of nickel-gold alloys but at a low brazing temperature. The powders were melted to produce a homogeneous nickel-gold-phosphorus alloy that was applied to the "T" samples in a slurry condition. The "T" samples and ternary nickel-gold-phosphorus brazing alloy were loaded in a vacuum furnace and heated at temperatures between 1750° F. and 1780° F. Tests of the "T" samples showed the braze alloy had good wetting characteristics when brazed in the 1750° F. to 1780° F. range. Rough, quantitative tests showed that the brazed joints were ductile.

While a preferred embodiment of the invention has been described, it is to be understood that the invention is not limited thereby and that in light of the present disclosure, various other alternative embodiments will be apparent to a person skilled in the art. Accordingly, it is to be understood that changes may be made without departing from the scope of the invention as particularly set forth and claimed. For example, by adjusting the proportions of the three elements of the ternary alloy, a series of ternary alloys can be obtained with varying melting temperatures. This will allow for custom tailoring of the braze temperature for various applications.

What is claimed:

1. A method for brazing metal components together using a ternary nickel-gold-phosphorus brazing alloy comprising the steps of (a) placing a ternary nickel-gold-phosphorus brazing alloy between two metal components to be joined, said brazing alloy consisting of between about 20 weight percent and about 80 weight percent gold, between about 1 weight percent and about 10 weight percent phosphorus, and the balance nickel and incidental impurities; (b) heating the assembly formed with said ternary nickel-gold-phosphorus brazing alloy and said metal components at least about the eutectic temperature of the brazing alloy and below 1830° F.; and (c) cooling the assembly to effectually produce a sturdy unitary assembly.

2. The method of claim 1 wherein in step (a) the components of the ternary nickel-gold-phosphorus brazing alloy consist of between about 30 weight percent and about 60 weight percent gold, between about 2 weight percent and about 6 weight percent phosphorus and the balance nickel with incidental impurities.

3. The method of claim 2 wherein in step (a) the composition of the ternary nickel-gold-phosphorus brazing alloy consists of between about 38 weight percent and about 42 weight percent gold, between about 2.5 weight percent and about 3.5 weight percent phosphorus and the balance nickel with incidental impurities.

4. The method of claim 1 wherein in step (b) the assembly is heated to a temperature of above about 40° F. of the eutectic temperature of the brazing alloy.

5. The method of claim 1 wherein in step (b) the assembly is heated to a temperature between about 1670° F. and about 1820° F.

6. The method of claim 5 wherein in step (b) the assembly is heated to a temperature between about 1730° C. and about 1780° F.

7. The method of claim 1 wherein the metal components are nickel-chromium based components.

8. The method of claim 4 wherein in step (a) the components of the ternary nickel-gold-phosphorus brazing alloy consist of between about 30 weight percent and about 60 weight percent gold, between about 2 weight percent and about 6 weight percent phosphorus and the balance nickel with incidental impurities.

9. The method of claim 5 wherein in step (a) the components of the ternary nickel-gold-phosphorus brazing alloy consist of between about 30 weight percent and about 60 weight percent gold, between about 2 weight percent and about 6 weight percent phosphorus and the balance nickel with incidental impurities.

10. The method of claim 6 wherein in step (a) the components of the ternary nickel-gold-phosphorus brazing alloy consist of between about 30 weight percent and about 60 weight percent gold, between about 2 weight percent and about 6 weight percent phosphorus and the balance nickel with incidental impurities.

11. The method of claim 7 wherein in step (a) the components of the ternary nickel-gold-phosphorus brazing alloy consist of between about 30 weight percent and about 60 weight percent gold, between about 2 weight percent and about 6 weight percent phosphorus and the balance nickel with incidental impurities.

12. A brazed metal assembly, said assembly having been brazed with a ternary nickel-gold-phosphorus brazing alloy having a composition consisting of between about 20 weight percent and about 80 weight percent gold, between about 1 weight percent and about 10 weight percent phosphorus, and the balance nickel and incidental impurities.

13. The brazed metal assembly of claim 12, wherein the composition of the ternary nickel-gold-phosphorus brazing alloy consist of between about 30 weight percent and about 60 weight percent gold, between about 2 weight percent and about 6 weight percent phosphorus and the balance nickel with incidental impurities.

14. The method of claim 13 wherein the composition of the ternary nickel-gold-phosphorus brazing alloy consist of between about 38 weight percent and about 42 weight percent gold, between about 2.5 weight percent and about 3.5 weight percent phosphorus and the balance nickel with incidental impurities.

15. The brazed assembly of claim 12 wherein the assembly is a stator vane.

16. The brazed metal assembly of claim 15 wherein the composition of the ternary nickel-gold-phosphorus brazing alloy consist of between about 30 weight percent and about 60 weight percent gold, between about 2 weight percent and about 6 weight percent phosphorus and the balance nickel with incidental impurities.

17. A ternary nickel-gold-phosphorus brazing alloy having a composite consisting of, by weight, between about 20 percent and about 80 percent gold, between about 1 percent and about 10 percent phosphorus and the balance nickel and incidental impurities.

18. The ternary nickel-gold-phosphorus brazing alloy of claim 17 wherein the composition of the ternary nickel-gold-phosphorus brazing alloy consist of between about 30 weight percent and about 60 weight percent gold, between about 2 weight percent and about 6 weight percent phosphorus and the balance nickel with incidental impurities.

19. The ternary nickel-gold-phosphorus brazing alloy of claim 18 wherein the composition of the ternary nickel-gold-phosphorus brazing alloy consist of between about 38 weight percent and about 42 weight percent gold, between about 2.5 weight percent and about 3.5 weight percent phosphorus and the balance nickel with incidental impurities.

20. The ternary nickel-gold-phosphorus brazing of claim 17 wherein the composition is in the form of a powder.

* * * * *